July 7, 1931.  O. D. H. BENTLEY  1,813,016

PACKING

Filed May 31, 1923

Witness
Jas. J. Maloney.

Inventor
Oliver D. H. Bentley
by his attorneys

Patented July 7, 1931

1,813,016

UNITED STATES PATENT OFFICE

OLIVER D. H. BENTLEY, OF NORFOLK, MASSACHUSETTS, ASSIGNOR TO B. F. STURTEVANT COMPANY, OF HYDE PARK, MASSACHUSETTS, A CORPORATION OF MASSACHUSETTS

PACKING

Application filed May 31, 1923. Serial No. 642,380.

The present invention relates to packings and more particularly to packings for sealing the joints about a moving rod or shaft of a machine to prevent leakage of gases and vapors through the necessary openings in the machine casing provided for the shaft.

The common type of "metallic" packing comprises rings of graphite or soft metal tightly surrounding the machine shaft and included within the stuffing box placed adjacent the machine casing. Such packings effectively prevent leakage directly along the shaft but difficulty has been experienced in providing a tight joint between the packing and the stuffing box itself so that ordinarily the gas or vapor is enabled to leak past the packing rings into the stuffing box and then into the atmosphere.

The object of the present invention is to provide a packing which will not only secure a seal along the shaft or rod itself, but will also prevent leakage past the packing and through the stuffing box.

With this object in view, the invention consists of the features of construction and combination and arrangements of parts hereinafter described and particularly defined in the claims.

Figure 1:
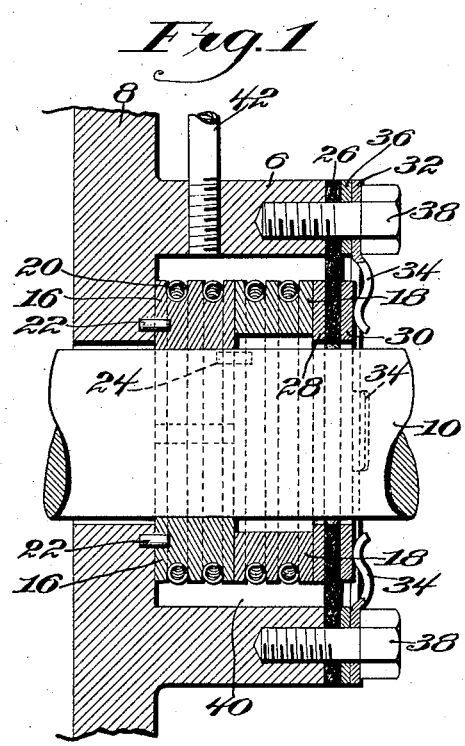
Figure 2:
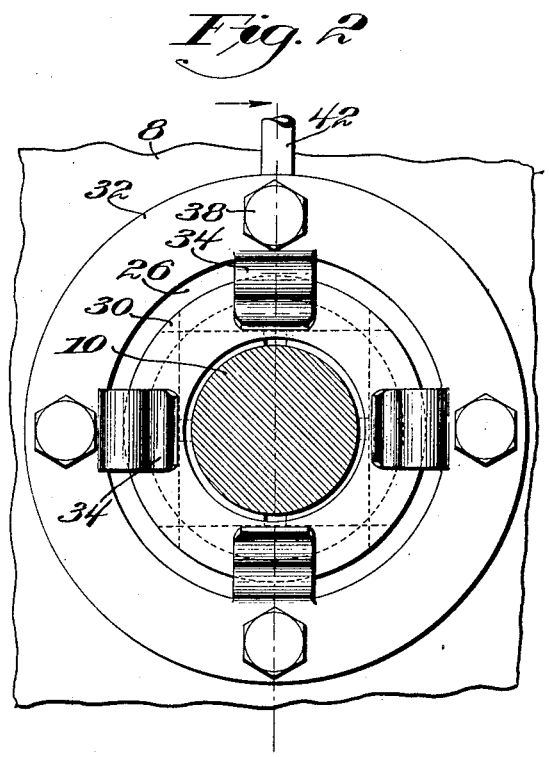
Figure 3:
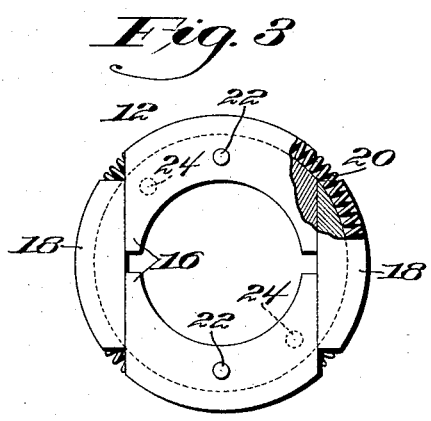
Figure 4:
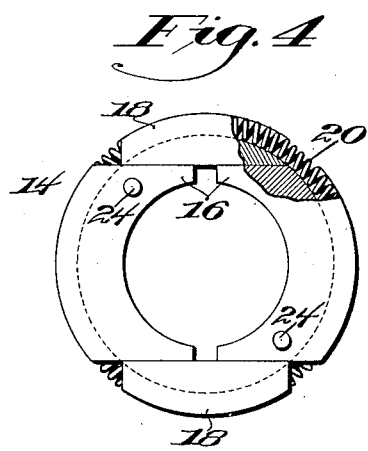

In the drawings, Figure 1 is a vertical sectional view of a portion of a machine casing provided with a stuffing box, with a shaft passing through the same, and with packing embodying the features of the present invention; Fig. 2 is an end elevation of the apparatus shown in Fig. 1; and Figs. 3 and 4 are details of the packing rings.

The invention is illustrated in the drawings as embodied in a packing for preventing leakage of steam through the casing of a steam turbine.

The illustrated embodiment of the invention comprises a packing casing or stuffing box 6 formed integral with the turbine casing 8 through which the rotatable shaft 10 passes. The shaft is surrounded by packing rings 12 and 14 of the form indicated in Figs. 3 and 4. Each ring comprises a pair of shaft-engaging segments 16 having flattened finished surfaces engaged by a pair of smaller cap segments 18, the entire ring being forced tightly about the shaft by means of the circular, helical springs 20. The rings are conveniently of graphite or of soft metal such as Babbitt metal. The joints of the rings 12 and 14 are arranged at ninety degrees from each other to provide overlapping joints. In order to prevent rotation of the packing rings and to maintain them in proper relative position, the ring 12 is anchored in the turbine casing by means of pins 22 and the ring 14 is anchored to ring 12 by means of pins 24, suitable holes being provided in the rings for receiving the pins. A tight joint is thus provided which effectively prevents leakage along the surface of the shaft either directly to the atmosphere or between the packing rings into the stuffing box.

In order to prevent leakage between the packing and the casing or stuffing box and between the latter and the atmosphere seals are provided at both ends of the stuffing box. Such seals are obtained by the means of a flexible ring 26 secured to the outer face of the stuffing box, the inner annular margin of which is included between a sealing ring 28 and an outer ring 30, both preferably of soft metal. The ring 28 is maintained in close engagement with the packing ring 14 by means of a spring member 32 having a plurality of spring fingers 34 bearing against the ring 30. The springs also tend to force the entire assembly toward the inner end of the stuffing box and tighten the inner joint. The flexible ring 26 and spring 32 together with a spacing ring 36 are secured to the outer end of the stuffing box by a series of bolts 38. The function of the flexible ring 26 is to close the interior of the stuffing box from the atmosphere and also to provide a flexible means by which the pressure of the spring fingers 34 may be exerted to form a tight seal between the ring 28 and the packing ring 14 and also between the ring 12 and casing 8 or end wall of the stuffing box. This flexible ring may be of metal but preferably consists of a stamping of fibrous packing material.

It will be seen that a double seal is thus provided at the inner and outer ends of the stuffing box to enclose a chamber 40 which will tend to equalize any pressure differences between the machine and the stuffing box in case any leakage starts to take place. It will also be seen that the action of the spring fingers 34 tends to maintain the seals against any differences of fluid pressure which may exist between the interior of the casing and the atmosphere, which pressure differences might tend to cause longitudinal movement of the packing rings. For example, if the turbine is run non-condensing so that the pressure within the turbine casing is slightly above atmosphere, any steam which leaks through into the stuffing box, being unable to escape on account of the outer seal, will increase the pressure within the stuffing box so that further leakage from the turbine is prevented. Or a pipe 42 may be provided which by the escape of steam therefrom will indicate a leakage at the inner seal. In case the turbine is run condensing so that the pressure within the turbine casing is well below atmosphere, the stuffing box will tend to become partially exhausted if there is a leak between the casing 8 and the ring 12. However, after slight exhaustion the pressures in the turbine and the stuffing box will tend to equalize and thereby prevent further leakage. Furthermore, steam may be supplied as by the pipe 42 to the chamber 40 which, held from free escape at the outer seal, will prevent the admission of air to the casing. This chamber 40 which surrounds the packing rings therefore forms a sealing chamber which is effective to prevent any substantial leakage between the turbine and the atmosphere. In order for any leakage to take place it must not only pass both joints, but must overcome the tendency of the stuffing box toward pressure equalizing, a condition which would be rarely met in practice unless the joints at the packing rings were extremely poor.

Although the invention has been illustrated as embodied in a packing for sealing the joints about a turbine shaft, it will be obvious that the invention is susceptible of many other embodiments. It will be understood that the invention is not limited to the specific construction shown and described, but may be changed or modified without departing from the broader features of the invention.

What is claimed is:

1. A packing comprising a stuffing box, a pair of packing rings each consisting of a pair of segmental shaft-engaging portions and a pair of segmental cap portions covering the shaft-engaging portions, the rings being held from rotational movement and being disposed relatively to one another to break joints, a sealing ring adjacent the outer packing ring, a flexible ring secured at its outer annular portion to the outer end of the stuffing box, and a spring member for forcing the inner annular portion of the flexible ring and the sealing ring inwardly to provide a tight joint at the outer end of the stuffing box, the spring member comprising an annular portion fixedly supported on the end of the stuffing box and a plurality of inwardly extending spring fingers.

2. A packing for a shaft comprising a stuffing box having an inner wall through which the shaft protrudes, packing rings fitting around the shaft to prevent leakage along the same, a closure for the outer end of the stuffing box having substantial surface engagement with the outer packing ring and including a flexible ring secured to the outer annular portion of the stuffing box, and a spring outside the closure and bearing against the closure to press the closure into engagement with the packing rings and to press the packing rings into close engagement with the inner wall of the stuffing box thereby enclosing a sealing chamber.

3. A packing comprising a stuffing box adapted to receive a shaft, packing material in the stuffing box to engage the shaft and prevent leakage along the shaft, and engaging over a considerable surface with the inner wall of the stuffing box, a closure for the outer end of the stuffing box consisting of a flexible ring, means for causing the outer peripheral portion of the ring to engage tightly with the outer end of the stuffing box, the inner portion of the ring having substantial surface engagement with the packing material, and a spring outside the closure and bearing against the inner unsecured portion of the closure to press the latter against the packing material and to press the packing material into close engagement with the inner walls of the stuffing box to enclose a sealing chamber.

4. A packing comprising a stuffing box adapted to receive a shaft, a packing ring fitting tightly the shaft to prevent leakage along the same and a second ring axially disposed with relation to the shaft and spaced therefrom, a flexible ring with its outer marginal portion secured to the box and its free inner marginal portion in engagement with the second ring, and means for pressing yieldingly such inner marginal portion inwardly of the box to hold the adjacent packing rings in close contact with one another, the inner ring in close contact with the inner face of the box, and the outer ring in close contact with the flexible ring.

5. A packing comprising a stuffing box adapted to receive a shaft, packing material in the stuffing box and engaging the shaft to prevent leakage along the same and engaging the inner end of the stuffing box and loosely fitting within the box to provide a sealing recess between the packing material in the inner wall of the box, a flexible ring loosely surrounding the shaft and secured to the outer end of the box and engaging with the outer end of the packing material, and spring devices pressing the ring against the packing to seal the sealing recess and force the packing material toward the inner end of the box to prevent leakage through the packing and between the packing and the inner end of the box.

OLIVER D. H. BENTLEY.